F. K. HUBER.
STALK CUTTER ATTACHMENT FOR SULKY PLOWS.
APPLICATION FILED JAN. 30, 1912.
1,041,288.
Patented Oct. 15, 1912.
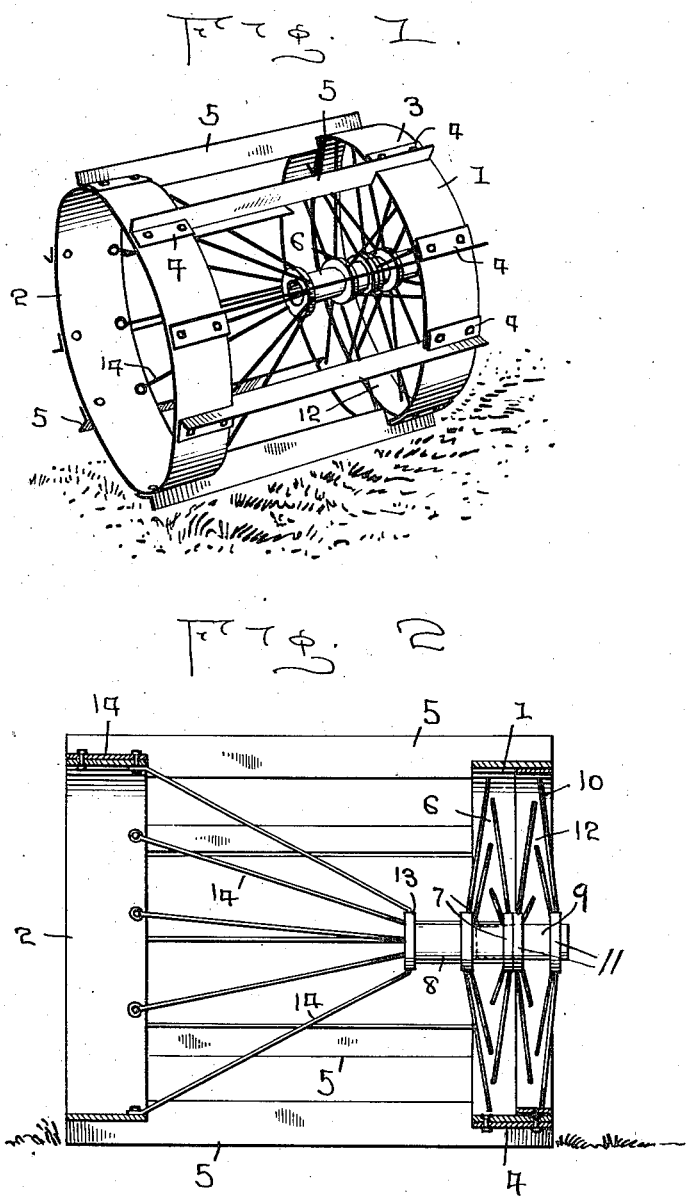
WITNESSES:
INVENTOR
F. K. Huber
BY
W. J. Fitzgerald & Co.
Attorneys

UNITED STATES PATENT OFFICE.

FREDERICK KONRAD HUBER, OF HAMLIN, TEXAS.

STALK-CUTTER ATTACHMENT FOR SULKY-PLOWS.

1,041,288. Specification of Letters Patent. Patented Oct. 15, 1912.

Application filed January 30, 1912. Serial No. 674,357.

*To all whom it may concern:*

Be it known that I, FREDERICK KONRAD HUBER, a citizen of the United States, residing at Hamlin, in the county of Jones and State of Texas, have invented certain new and useful Improvements in Stalk-Cutter Attachments for Sulky-Plows; and I do hereby declare the following to be a full, clear, and exact description of the invention, such as will enable others skilled in the art to which it appertains to make and use the same.

This invention relates to stalk cutters and more particularly to stalk cutter attachments for sulky plows.

An object of the invention is to provide a stalk cutter which may be readily attached to a sulky plow or similar implement for cutting stalks to one side of the implement to which the attachment is secured during the operation of said implement.

A further object is to provide a stalk cutter of this character which will be highly efficient and effective in operation and the blades of which may be secured to the rings in such manner as to be readily detached for sharpening and like purposes.

Other objects and advantages will be hereinafter set forth and pointed out in the specification and claims.

In the accompanying drawing which are made a part of this application, Figure 1 is a perspective view of the stalk cutter, and, Fig. 2 is a longitudinal sectional view through the same and through one wheel of a plowing implement, over which wheel the cutter attachment is secured.

Referring more particularly to the drawings in which similar reference numerals designate corresponding parts throughout the several views, 1 and 2 represent rings forming the opposite ends of the attachment and having the oppositely bent ends 3 and 4 respectively of the blades 5 detachably secured thereto. The straight spokes 6 have their outer ends secured to the inner face of the ring 1 and their inner ends secured to the flanges 7 positioned upon the hub 8 which is adapted for engagement over the outer end of the hub 9 of the wheel 10 forming one of the wheels of the sulky plow or other farming implement. The wheel hub 9 carries the flanges 11 from which the spokes 12 project radially and have their outer ends secured to the wheel 10, over which the ring 1 fits snugly when the attachment is in position.

The hub 8 projects a short distance in the direction of the ring 2 and carries upon this end a flange 13 from which the end spokes 14 project toward the near edge of the ring 2, the extremities of the spokes 14 being secured to the inner face of the ring 2 in any suitable manner.

It will be understood that the wheel 10 is of such width as to permit of the same being received within the ring 1 and the hub 9 of said wheel within the end of the hub 8 of the attachment. The attachment fits snugly over the wheel and hub, however, thus causing the cutter attachment to rotate with the wheel of the implement. As the cutter attachment is removably secured to one wheel of the sulky plow or other farming implement, to one side thereof and outwardly of the wheel, the blades 5 will serve to cut the stalks to the side of the machine during the operation of the latter, thus eliminating the necessity of employing two separate machines for cutting the stalks and plowing or cultivating the ground.

By connecting the inner ends of the spokes 14 to the end of the hub 8, adjacent the ring 1, the outer end of the attachment is left open without any hub and spokes within the center of the ring 2 to catch the stalks and thus hinder the operation of the cutter attachment. Further, owing to the detachable connection of the ends 3 and 4 of the blades 5 with the rings 1 and 2 respectively, said blades may be readily removed for grinding and like purposes.

It will be apparent that this attachment may be readily secured to or removed from any sulky plow or other farming implement now in use.

What I claim is:—

1. A cutter attachment for farming implements comprising rings, blades connected to the rings, a hub within one of the rings and directed toward the opposite ring, said hub being adapted for engagement over the hub of a wheel while the ring around the first mentioned hub is adapted for engagement over the wheel.

2. A stalk cutter attachment comprising rings, a hub within one of the rings and projecting a short distance in the direction of the opposite ring, spokes connecting the hub with the rings, and detachable cutter blades having their opposite ends removably secured to the rings.

3. The combination with a wheel and hub of a farming implement; of a cutter attachment comprising a ring adapted for engagement over the wheel, a hub within the ring and adapted for engagement over the hub of the wheel, a second ring, connections between the hub and the rings, and cutter blades carried by said rings.

In testimony whereof I have signed my name to this specification in the presence of two subscribing witnesses.

FRED. KONRAD HUBER.

Witnesses:
D. J. PAYNE,
D. I. TERRELL.